US008473681B2

(12) United States Patent
Lin et al.

(10) Patent No.: US 8,473,681 B2
(45) Date of Patent: Jun. 25, 2013

(54) ATOMIC-OPERATION COALESCING TECHNIQUE IN MULTI-CHIP SYSTEMS

(75) Inventors: Qi Lin, Los Altos Hills, CA (US); Liang Peng, San Jose, CA (US); Craig E. Hampel, Los Altos, CA (US); Thomas J. Sheffler, San Francisco, CA (US); Steven C. Woo, Saratoga, CA (US); Bohuslav Rychlik, San Diego, CA (US)

(73) Assignee: Rambus Inc., Sunnyvale, CA (US)

( * ) Notice: Subject to any disclaimer, the term of this patent is extended or adjusted under 35 U.S.C. 154(b) by 127 days.

(21) Appl. No.: 13/143,993

(22) PCT Filed: Feb. 2, 2010

(86) PCT No.: PCT/US2010/022886
§ 371 (c)(1),
(2), (4) Date: Jul. 11, 2011

(87) PCT Pub. No.: WO2010/096263
PCT Pub. Date: Aug. 26, 2010

(65) Prior Publication Data
US 2011/0289510 A1  Nov. 24, 2011

Related U.S. Application Data

(60) Provisional application No. 61/153,214, filed on Feb. 17, 2009.

(51) Int. Cl.
*G06F 13/00* (2006.01)

(52) U.S. Cl.
USPC .... 711/121; 711/124; 711/141; 711/E12.023; 712/32

(58) Field of Classification Search
None
See application file for complete search history.

(56) References Cited

U.S. PATENT DOCUMENTS

| 6,785,888 | B1 | 8/2004 | McKenney | |
|---|---|---|---|---|
| 2002/0007443 | A1 | 1/2002 | Gharachorloo | |
| 2004/0073754 | A1 | 4/2004 | Cypher | |
| 2004/0103249 | A1* | 5/2004 | Lin | 711/118 |
| 2005/0027793 | A1 | 2/2005 | Hass | |
| 2006/0047917 | A1* | 3/2006 | Godin et al. | 711/146 |
| 2006/0288173 | A1* | 12/2006 | Shen | 711/141 |

* cited by examiner

*Primary Examiner* — Edward Dudek, Jr.
*Assistant Examiner* — Sean D Rossiter (57) ABSTRACT

A cache-coherence protocol distributes atomic operations among multiple processors (or processor cores) that share a memory space. When an atomic operation that includes an instruction to modify data stored in the shared memory space is directed to a first processor that does not have control over the address(es) associated with the data, the first processor sends a request, including the instruction to modify the data, to a second processor. Then, the second processor, which already has control of the address(es), modifies the data. Moreover, the first processor can immediately proceed to another instruction rather than waiting for the address(es) to become available.

35 Claims, 4 Drawing Sheets

ATOMIC-OPERATION COALESCING TECHNIQUE IN MULTI-CHIP SYSTEMS

TECHNICAL FIELD

The present embodiments relate to techniques for performing operations in computer systems. More specifically, the present embodiments relate to circuits and methods for forwarding and processing atomic operations between processing elements.

BACKGROUND

Modern computer systems can split executing programs into two or more threads of operation (which are referred to as 'threads') for more efficient processing. Single-processor systems execute multiple threads, which is called 'multithreading,' by periodically switching between the threads. Systems with multiple processors or processor cores (henceforth referred to collectively as 'processing elements'), can execute multiple threads simultaneously on different processing elements. Such functionality, which is called simultaneous multithreading (SMT), is gaining popularity as the computer industry turns to multi-processor or multi-core systems for improved performance.

SMT complicates memory access because significant increases in memory bandwidth and more-efficient data-sharing techniques are often needed to support coherence and atomicity. Efforts to overcome this problem include cache-coherent non-uniform memory-access (ccNUMA), which safely coordinate data accesses in systems with multiple SMT processors. These efforts fall short because of significant data-transfer inefficiencies and latency overheads. For example, passing shared data between multiple processors can consume a large percentage of the multi-processing bandwidth, especially when highly contended data is forwarded to a processor that is attempting to execute an operation involving the data. Therefore, there is a need for techniques and systems that support improve protocols for coherence and atomic operations.

DETAILED DESCRIPTION

Figure 1:
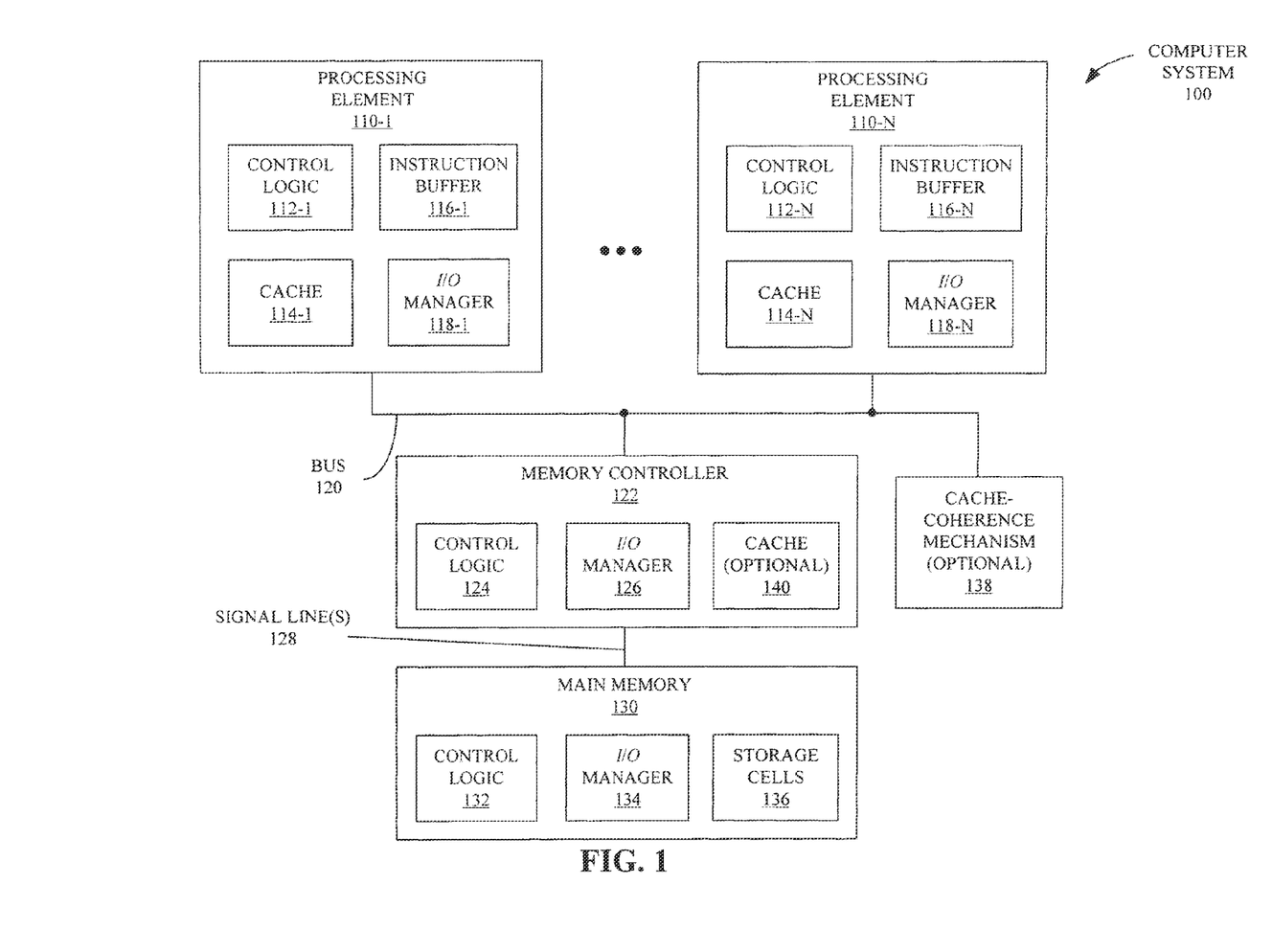
FIG. 1 depicts a computer system that includes processing elements which share an address space in accordance with an embodiment that forwards and processes atomic operations.

FIG. 1 presents a computer system 100 that includes multiple processing elements 110 that share a common address space provided by main memory 130 and caches 114 in the processing elements 110. In this computer system, a cache-coherence protocol distributes atomic operations among the processing elements 110, and each processing element has write control over its associated cache 114. For example, both processing elements 110-1 and 110-N can read from the other's cache, but only processing element 110-1 can write data to cache 114-1. All the processing elements can also read from and write to main memory 130 via a memory controller 122.

Memory controller 122 can issue requests via a bus 120 instructing processing elements 110-1 to 110-N to perform various operations. These operations include so-called 'atomic operations,' each of which includes a set of simpler operations that, when executed, either completes or fails in its entirety. Incrementing the value stored in a memory location is a common example of an atomic operation that requires three simpler operations be accomplished: the data value to be incremented must be read from the memory location, the value read must be incremented, and the resulting incremented value must be written back to the memory location. Should any of these three sub-operations fail, the entire atomic increment operation fails.

When controller 122 sends a request to one of the multiple processing elements to execute an atomic operation that attempts to read and modify data in a shared memory location, the recipient processing element determines whether it has write access to the shared memory location (i.e., determines a cache-coherence-protocol state of the shared memory location). If not, then the processing element broadcasts a request for the data to one or more of the remaining processing elements via bus 120. This request includes instructions for executing the atomic operation so that if another of the processing elements has write access to the targeted memory location, that processing element can execute the instructions to efficiently complete the atomic operation. For example, if processing element 110-1 receives a request to increment a value not stored locally in cache 114-1, processing element 110-1 can broadcast a request for the data on bus 120. If the data is not in any of the caches 114-1 through 114-N, then memory controller 122 retrieves the data from, e.g., main memory 130 and sends it to processing element 110-1, which completes the atomic operation normally. The updated value is then cached in cache 114-1, and the updated value may be reflected in main memory 130 to maintain coherency. If the data to be incremented resides in cache 114-N, however, then processing element 110-N performs the requested increment operation and reports completion to processing element 110-1. Processing element 110-1 is thus freed from performing the operation.

In the foregoing example of a cache-coherence protocol, moving the atomic increment operation from element 110-1 to 110-N reduces latency in computer system 100 because processing element 110-1 can immediately proceed to another instruction rather than waiting for the data or cache input/output line(s) associated with the data (which may be providing data for another process) to become available. Moreover, because processing element 110-N is proximate to the data in the appropriate cache-coherence-protocol state (i.e., because processing element 110-N is the most efficient location in computer system 100 to execute the one or more instructions), the data does not need to be communicated to processing element 110-N (or to processing element 110-1), and the amount of traffic on bus 120 and the coordination overhead for associated synchronization or coherence events are reduced. Additionally, by forwarding the one or more instructions, the atomicity of operations is improved because the execution of the one or more instructions can be coalesced at a single processing element.

Processing elements 110 may execute one or more threads (either sequentially or, at least in part, in parallel with each other). The shared address space in computer system 100 ensures that a respective instance of an operation in one of threads is only executed at one location in computer system 100. For a given operation for one of these threads, the operation type (atomic or non-atomic) may be indicated by a tag (or delimiter), which is specified in software for processing elements 110. For example, the operation type may be provided to a compiler by middleware. In the discussion that follows, an atomic operation is understood to include one or more instructions in a given instruction set architecture that, when executed, either completes or fails in its entirety, and, if successful, executes without a conflict occurring at one or more addresses for data associated with the atomic operation (which is henceforth referred to as "atomic-operation data").

Returning to processing element 110-1 as an illustration, when input/output (I/O) manager 118-1 in element 110-1 receives an instruction to execute an operation, the instruction is stored in a queue in instruction buffer 116-1. Subsequently, control logic 112-1 (such as an arithmetic logic unit) processes the operation. If the operation is a non-atomic operation, control logic 112-1 determines if data associated with the non-atomic operation (henceforth referred to as "non-atomic-operation data") is stored in cache 114-1 in one of a group of appropriate cache-coherence-protocol states. For example, control logic 112-1 may determine if processing element 110-1 has control of address(es) for the non-atomic-operation data in an appropriate cache-coherence-protocol state in cache 114-1. At a given time, data stored at different locations within the shared address space may have a variety of cache-coherence-protocol states (with a given state at each location). For a given copy of the data (such as a copy in cache 114-1), these states include: a 'modified' state, which indicates that the given copy is the most up-to-date and only copy of the data (so the given copy can be written to); a 'shared' state, which indicates that there are up-to-date copies of the data at other locations in computer system 100 (so the given copy cannot be written to); an 'exclusive' state, which indicates that the given copy and a copy of the data in main memory 130 are up-to-date (so the given copy can be written to); an 'owned' state, which indicates that the given copy is up-to-date and that there can be up-to-date copies of the data at other locations in computer system 100, but the copy in main memory 130 is not up-to-date; and/or an 'invalid' state, which indicates that the given copy is stale. Note that the atomic-operation data may be produced as an output of the atomic operation or may be an input to the atomic operation (i.e., the atomic operation may be a producer or a consumer of the atomic-operation data).

If the non-atomic-operation data is stored in cache 114-1 in the modified or exclusive states, control logic 112-1 modifies the non-atomic-operation data in accordance with one or more instructions associated with the non-atomic operation. If the non-atomic-operation data is not stored in cache 114-1, or is stored in cache 114-1 in one of the other cache-coherence-protocol states, control logic 112-1 instructs I/O manager 118-1 to issue a first request for the non-atomic-operation data on bus 120. This first request indicates that processing element 110-1 needs the non-atomic-operation data (or control over the associated address(es) such that the non-atomic operation data in cache 114-1 is in the modified or exclusive states). Note that the first request does not include the non-atomic operation.

Subsequently, I/O manager 118-1 receives a reply from one or more components in computer system 100. For example, I/O manager 118-1 may receive the non-atomic-operation data from another one of processing elements 110 or from main memory 130. Alternatively, one or more of the other processing elements 110 may dump the non-atomic-operation data from their caches, and the reply may indicate a change of the cache-coherence-protocol state of the non-atomic-operation data in cache 114-1. Then, control logic 112-1 modifies the non-atomic-operation data in accordance with one or more instructions associated with the non-atomic operation.

If the operation is an atomic operation, control logic 112-1 also determines if atomic-operation data is stored in cache 114-1 in the modified or exclusive states. If yes, control logic 112-1 modifies the atomic-operation data in accordance with one or more instructions associated with the atomic operation. However, if the atomic-operation data is not stored in cache 114-1, or is stored in cache 114-1 in one of the other cache-coherence-protocol states, control logic 112-1 instructs I/O manager 118-1 to issue a second request for the atomic-operation data on bus 120. This second request includes the atomic operation (including one or more instructions associated with the atomic operation that are to be executed as a unit) and indicates the necessary atomic-operation data (or the associated address(es) in the shared address space).

In some embodiments, the second request is directed to a particular one of the other processing elements 110 (or another component in computer system 100). In particular, a cache-coherence engine in computer system 100 may be distributed among the components in computer system 100 (such as among the processing elements 110, the memory controller 122 and/or main memory 130). For example, the cache-coherence engine may be implemented in a look-up table which is stored in caches 114. Mechanisms (usually hardware) in computer system 100 can maintain the look-up table by tracking where the most-current version of the atomic-operation data resides and/or where this atomic-operation data is needed next for a subsequent operation. Using the look-up table, control logic 112-1 can determine which (if any) of the other processing elements 110 (or another component in computer system 100) has the atomic-operation data in the modified or exclusive states (for example, processing element 110-N). Furthermore, in some embodiments, the second request is directed to a particular one of the other processing elements 110 (or a subset that includes one or more of the other processing elements 110) based at least in part on a type of the particular processing element and/or a performance characteristic of the particular processing element. For example, the type of processing element may include a graphics processing element, a single-precision floating-point processing element, a double-precision floating-point processing element, an integer processing element and/or a conditional processing element. In these embodiments, the particular one of the other processing elements 110 may be selected because the associated type of processing element is superior than other processing elements 110 in performing the atomic operation. Similarly, the performance characteristic may be intrinsic to the particular one of the other processing elements 110 and/or may include extrinsic factors, such as a physical location on or latency associated with bus 120.

Based on this information, control logic 112-1 may instruct I/O manager 118-1 to issue the second request to processing element 110-N via bus 120 (forwarding of the second request may be implemented in hardware and/or in software). After I/O manager 118-N receives this second request, control logic 110-N may modify the atomic-operation data in accordance with one or more instructions associated with the atomic operation. Then, control logic 110-N may instruct I/O manager 118-N to reply to processing element 110-1 via bus 120 to indicate that the atomic-operation has been performed.

However, it may be difficult to ensure that the look-up table is always up-to-date in real time, especially when there are multiple threads executing in parallel. Consequently, in some embodiments, a distributed approval process among processing elements 110 may take place before processing element 110-N executes the atomic operation. For example, I/O managers 118 in the other processing elements 110 may receive the second request from processing element 110-1. Control logic 112 in each of these processing elements 110 may confirm that the cache-coherence-protocol state of the atomic-operation data in their caches 114 (if present) is not in the modified or exclusive states. Then, control logic 112 may instruct their respective I/O managers 118 to reply on bus 120 to inform processing element 110-N. Processing element 110-N may await all of these replies prior to executing the atomic operation.

In other embodiments, the cache-coherence engine is centralized, for example, the look-up table may be stored and maintained in optional cache-coherence mechanism 138. In these embodiments, control logic 112-1 may instruct I/O manager 118-1 to issue a second request on bus 120 to optional cache-coherence mechanism 138 if the atomic-operation data is not in the modified or exclusive states in cache 114-1. Optional cache-coherence mechanism 138 may determine that processing element 110-N has the atomic-operation data in the modified or exclusive states in cache 114-N. Then, optional cache-coherence mechanism 138 may relay the second request on bus 120 to processing element 110-N for subsequent execution.

The second request from processing element 110-1 may include the source (processing element 110-1) as well as a time interval for execution. If none of the other processing elements 110 (or another component in computer system 100) has executed the atomic operation within the time interval, the request may expire. (Alternatively, this control function may be managed at a higher level in computer system, such as by the software which provides operations to processing elements 110).

If the request from processing element 110-1 expires, computer system 100 may revert to treating the request as if it were for a non-atomic operation. In particular, components on bus 120 may determine that processing element 110-1 needs the atomic-operation data (or control over the associated address(es) such that the atomic operation data in cache 114-1 is in the modified or exclusive states). Thus, I/O manager 118-1 may receive a reply after the time interval from one or more components in computer system 100. For example, I/O manager 118-1 may receive the atomic-operation data from another one of processing elements 110 or from main memory 130. Alternatively, one or more of the other processing elements 110 may dump the atomic-operation data from their caches, and the reply may indicate a change of the cache-coherence-protocol state of the atomic-operation data in cache 114-1. Then, control logic 112-1 modifies the atomic-operation data in accordance with one or more instructions associated with the atomic operation.

After one of the components in computer system 100 has executed the atomic operation (such as processing element 110-N), the updated atomic-operation data can be forwarded to another component in computer system 100 and/or may continue to reside in cache 114-N.

Ideally, cache lines associated with the atomic-operation data are only cacheable by a designated processing element (such as processing element 110-N) until the atomic operation has been executed. However, in some embodiments, it may be necessary to use a local cache-coherence protocol in conjunction with the atomic operations supported by the instruction set architecture in computer system 100.

Based on the preceding discussion, atomic-operation forwarding in the cache-coherence protocol can be implemented as a remote helper thread or procedure call. This technique leverages the power of the processing elements 110 for faster execution of atomic operations. It may also benefit from the very low L1 cache access time for a large number of operations. Moreover, the cache-coherence protocol may be particularly useful when workloads include highly contended atomic operations on a limited number of cache lines in the shared address space.

While the preceding discussion used execution of the second request by another of the processing elements 110 as an illustrative example, in other embodiments, one or more other component(s) in computer system 100 may execute the atomic operation in response to the second request from processing element 110-1 or optional cache-coherence mechanism 138. For example, in some embodiments, the atomic operation may be executed by main memory 130 (such as dynamic random access memory or DRAM). In particular, I/O manager 126 in memory controller 122 may receive the second request, and may forward it to main memory 130 via one or more signal lines 128, where it is received by I/O manager 134.

If none of the other processing elements 110 performs the atomic operation, and the atomic-operation data is stored in one or more storage cells 136 in the modified or exclusive states, control logic 132 may modify the atomic-operation data in accordance with one or more instructions associated with the atomic operation. Then, control logic 132 may instruct I/O manager 134 to inform processing element 110-1, via the one or more signal lines 128, memory controller 122 and bus 120, that the atomic operation has been performed.

This approach may be useful for certain workloads where caching of the processing elements 110 is minimal or cache-coherence overhead is very high. Thus, in these embodiments, atomic operations may be executed at a memory module or memory device that contains the atomic-operation data. Moreover, the address(es) associated with the atomic-operation data may be designated as invalid and un-cacheable in caches 114 until the atomic operation is completed.

Separately and/or additionally, in some embodiments, memory controller 122 forwards or executes the second request. In particular, I/O manager 126 in memory controller 122 may receive the second request. If none of the other processing elements 110 performs the atomic operation, and the atomic-operation data is stored in one or more storage cells 136 in the modified or exclusive states in main memory 130 controlled by memory controller 122, control logic 124 may instruct I/O manager 126 to forward the second request (including the atomic operation) to main memory 130 for execution (as described previously). Alternatively, if the atomic-operation data is stored in the modified or exclusive states in optional cache 140, control logic 124 may modify the atomic-operation data in accordance with one or more instructions associated with the atomic operation. After the atomic operation has been executed by either main memory 130 or the memory controller 122, control logic 124 may instruct I/O manager 126 to inform processing element 110-1, via bus 120, that the atomic operation has been performed.

This approach may be useful for certain workloads where the amount of temporal locality and reuse is between little and significant (in the former case, processing and execution of the second request by main memory 130 may be more efficient, while in the latter case, processing and execution of the second request by one of the processing elements 110 may be more efficient). Thus, in these embodiments, atomic operations may be forwarded or executed by memory controller 122. Moreover, the address(es) associated with the atomic-operation data may be designated as invalid and un-cacheable in caches 114 until the atomic operation is completed.

The preceding embodiments describe processing and execution of the atomic operation by a single component in computer system 100. However, in other embodiments, processing of the atomic operation is performed by multiple components in computer system 100. For example, if the address(es) associated with atomic-operation data is constantly used by a number of processing elements 110, the safest way to ensure a uniform update of the atomic-operation data may be to invalidate the address(es) in the caches 114 and to render the address(es) un-cacheable. Then, I/O managers 118 can synchronize the atomic-operation data for the address(es), and can modify the atomic-operation data in accordance with one or more instructions associated with the atomic operation. This approach may reduce the number of reads and writes to memory (such as caches 114 and/or main memory 130).

Figure 2A:
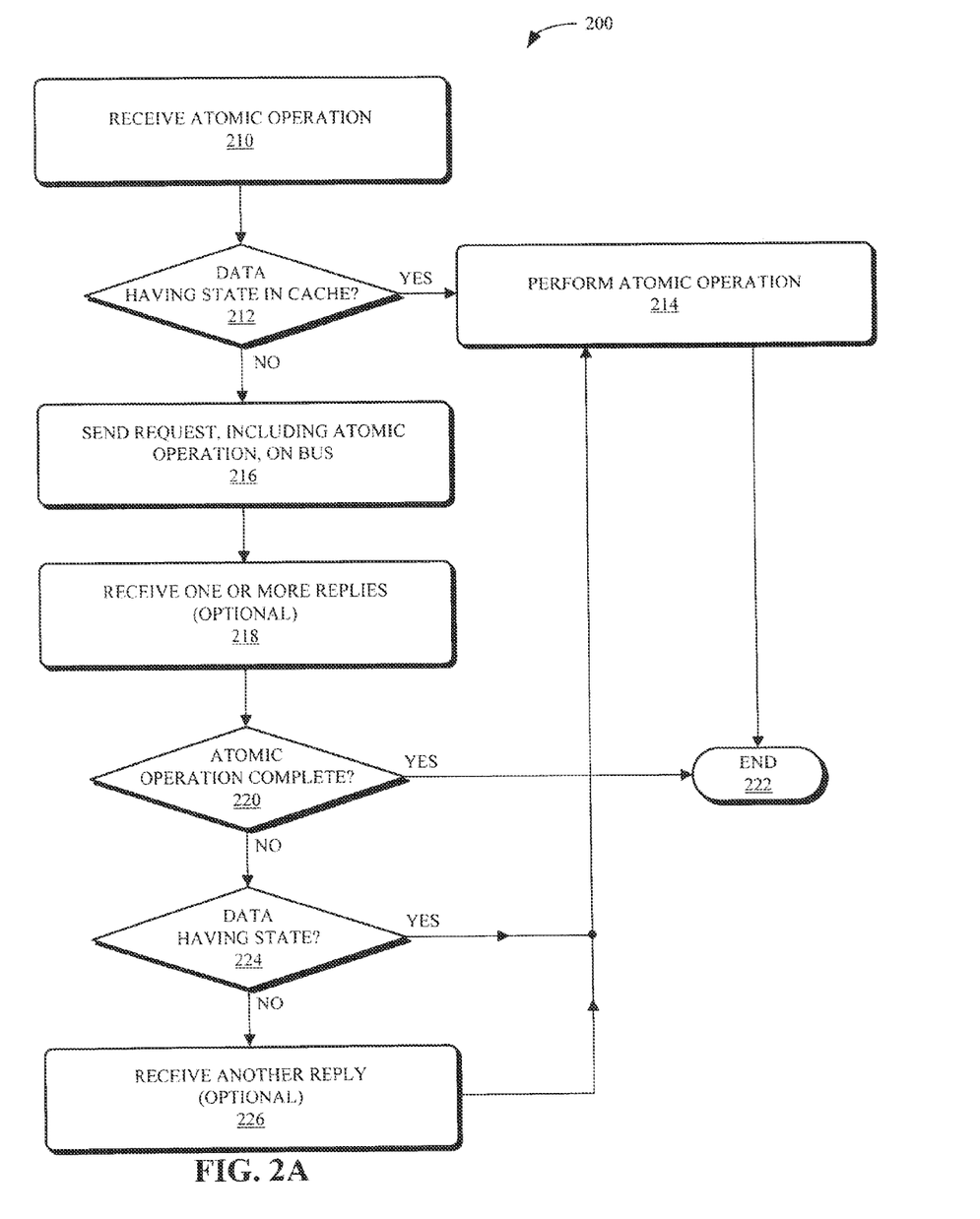
FIG. 2A depicts a method for processing or forwarding an atomic operation by a processing element in the computer system of FIG. 1 in accordance with an embodiment.

FIG. 2A presents a method 200 for processing or forwarding an atomic operation by one of the processing elements 110 (FIG. 1) in computer system 100 (FIG. 1), such as processing element 110-1 (FIG. 1). During operation, processing element 110-1 (FIG. 1) receives an atomic operation with one or more instructions to modify atomic-operation data stored in one or more shared address locations (210). In response to the received atomic operation, processing element 110-1 (FIG. 1) determines if the atomic-operation data is stored in cache 114-1 (FIG. 1) in an appropriate cache-coherence-protocol state (212). For example, control logic 112-1 (FIG. 1) may determine if the atomic-operation data is stored in the one or more shared address locations in cache 114-1 (FIG. 1) in the modified or exclusive states. If yes, processing element 110-1 (FIG. 1) performs the atomic operation (214) and modifies the atomic-operation data in accordance with the one or more instructions associated with the atomic operation. Then, processing element 110-1 (FIG. 1) terminates or ends (222) the method 200.

If not, processing element 110-1 (FIG. 1) provides the second request for the atomic-operation data, which includes the atomic operation, on bus 120 (FIG. 1) (216). For example, using a distributed cache-coherence engine, processing element 110-1 (FIG. 1) may determine that the atomic-operation data is stored in cache 114-N (FIG. 1) in the modified or exclusive states, and may send the second request to the processing element 110-N (FIG. 1). This request includes the atomic operation to modify the atomic-operation data stored in the at least one of the one or more shared address locations.

Alternatively, processing element 110-1 (FIG. 1) may send the second request to the optional cache-coherence mechanism 138 (FIG. 1). Optional cache-coherence mechanism 138 (FIG. 1) may determine if the atomic-operation data is stored in another of the caches 114 (FIG. 1) in the modified or exclusive states. If yes, optional cache-coherence mechanism 138 (FIG. 1) may provide the second request, including the atomic operation, to another processing element via bus 120 (FIG. 1). For example, in response to the received second request, optional cache-coherence mechanism 138 (FIG. 1) may determine whether any of the address(es) in the one or more shared address locations is allocated to processing element 110-N (FIG. 1), with the atomic-operation data having the modified or exclusive states, and, if so, relays the second request to processing element 110-N (FIG. 1). In some embodiments, optional cache-coherence mechanism 138 (FIG. 1) determines if the atomic-operation data is stored in another of the caches 114 (FIG. 1), with the data having the modified or exclusive state, by performing a lookup into a look-up table, which includes storage and state information for the caches 114 (FIG. 1).

Subsequently, processing element 110-1 (FIG. 1) optionally receives one or more replies from other components in computer system 100 (FIG. 1) (218). (In some embodiments, processing element 110-1 in FIG. 1 assumes that the atomic operation has been performed unless a reply is received indicating that it was not.) If one of these optional replies indicates that the atomic operation has been performed (for example, by processing element 110-N in FIG. 1) (220), processing element 110-1 (FIG. 1) terminates or ends (222) the method 200.

Alternatively, if one of the optional replies provides the atomic-operation data in the appropriate cache-coherence-protocol state, or indicates a change to the cache-coherence-protocol state of the atomic-operation data in cache 114-1 in FIG. 1 (224), processing element 110-1 (FIG. 1) performs the atomic operation (214). Then, processing element 110-1 (FIG. 1) terminates or ends (222) the method 200.

If none of the replies indicates that the atomic operation has been performed or provides (directly or indirectly) the atomic-operation data in the appropriate cache-coherence-protocol state, processing element 110-1 (FIG. 1) awaits another optional reply (226) from one of the components in computer system 100 (FIG. 1), such as a reply that occurs when the second request times out. This reply provides the atomic-operation data in the appropriate cache-coherence-protocol state or indicates a change to the cache-coherence-protocol state of the atomic-operation data in cache 114-1 in FIG. 1. Subsequently, processing element 110-1 (FIG. 1) performs the atomic operation (214), and terminates or ends (222) the method 200.

Figure 2B:
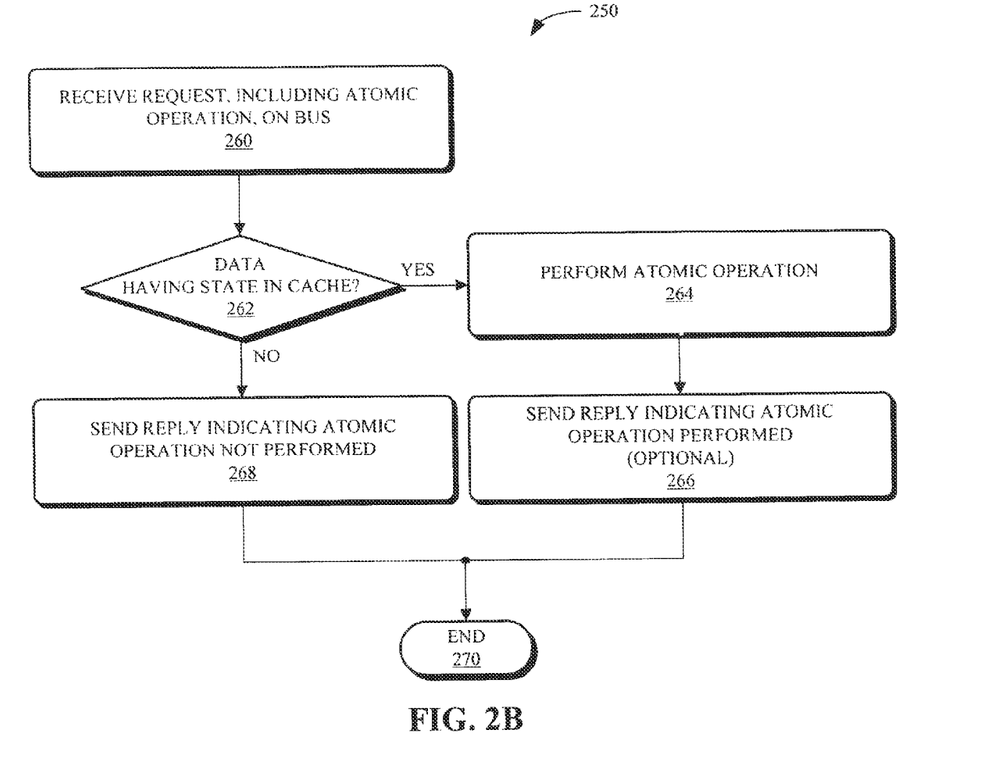
FIG. 2B depicts a method for processing a forwarded atomic operation by a processing element in the computer system of FIG. 1 in accordance with an embodiment.

FIG. 2B presents a method 250 for processing a forwarded atomic operation by one of the processing elements 110 (FIG. 1) in computer system 100 (FIG. 1), such as processing element 110-N (FIG. 1). During operation, processing element 110-N (FIG. 1) receives the second request, including the atomic operation, on bus 120 (FIG. 1) (260). In response to the received second request, processing element 110-N (FIG. 1) determines if the atomic-operation data is stored in cache 114-N (FIG. 1) in the appropriate cache-coherence-protocol state (262). For example, control logic 112-N (FIG. 1) may determine if the atomic-operation data is stored in the one or more shared address locations in cache 114-N (FIG. 1) in the modified or exclusive states. If yes, processing element 110-N (FIG. 1) performs the atomic operation (264) and modifies the atomic-operation data in accordance with one or more instructions associated with the atomic operation. Then, processing element 110-N (FIG. 1) optionally sends a reply to processing element 110-1 (FIG. 1) on bus 120 (FIG. 1) which indicates that the atomic operation has been performed (266), and processing element 110-N (FIG. 1) terminates or ends (270) the method 250. (As noted previously, in some embodiments processing element 110-1 in FIG. 1 assumes that the atomic operation has been performed unless a reply is received indicating that it was not. Therefore, processing element 110-N may not need to send optional reply in operation 266.) If no, processing element 110-N (FIG. 1) sends a reply to processing element 110-1 (FIG. 1) on bus 120 (FIG. 1) which indicates that the atomic operation has not been performed (268), and processing element 110-N (FIG. 1) terminates or ends (270) the method 250.

Figure 3:
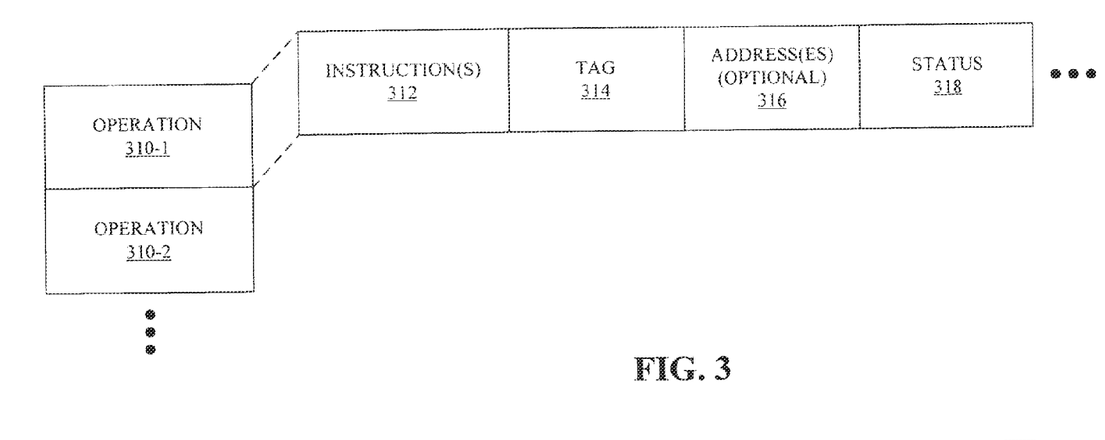
FIG. 3 depicts operations in an instruction buffer of a processing element in the computer system of FIG. 1 in accordance with an embodiment.

FIG. 3 presents operations 310 in an instruction buffer for one of the processing elements 110 (FIG. 1) in computer system 100 (FIG. 1), such as instruction buffer 116-1 (FIG. 1) in processing element 110-1 (FIG. 1). This information may be used by control logic 112-1 (FIG. 1) in processing element 110-1 (FIG. 1) during method 200 (FIG. 2A). A given operation, such as operation 310-1, may include: one or more instructions 312, a tag 314 (which indicates if operations 310-1 is atomic or non-atomic), one or more optional addresses 316 in shared address location for associated data, and/or a status 318 (such as completed or pending) of operation 310-1.

Figure 4:
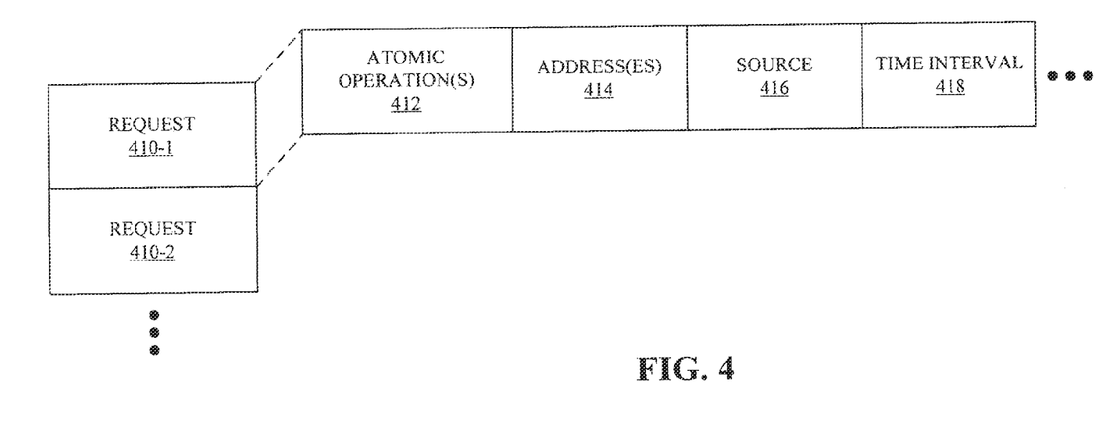
FIG. 4 depicts a data structure that holds requests communicated on a bus between processing elements in the computer system of FIG. 1 in accordance with an embodiment.

FIG. 4 presents a data structure storing requests 410 communicated on a bus 120 (FIG. 1) between processing elements 110 (FIG. 1) in computer system 100 (FIG. 1). For example, requests 410 in the data structure may be stored in and processed by processing element 110-N (FIG. 1) according to method 250 (FIG. 2B). A given request, such as request 410-1, may be a second request, and may include: one or more atomic operations 412, one or more addresses 414 for atomic-operation data in the shared address space, a source 416 of request 410-1 (such as processing element 110-1 in FIG. 1), and/or a time interval 418 during which the request 410-1 is valid (after which, request 410-1 expires).

Although computer system 100 (FIG. 1) is illustrated as having a number of discrete items, FIG. 1 is intended to be a functional description of the various features that may be present in computer system 100 (FIG. 1) rather than a structural schematic of the embodiments described herein. In practice, and as recognized by those of ordinary skill in the art, the functions of the computer system 100 (FIG. 1) may be distributed over a large number of components, with various groups of the components performing particular subsets of the functions. In some embodiments, some or all of the functionality of computer system 100 (FIG. 1) may be implemented in one or more application-specific integrated circuits (ASICs) and/or one or more digital signal processors (DSPs). Additionally, the functionality of computer system 100 (FIG. 1) may be implemented more in hardware and less in software, or less in hardware and more in software, as is known in the art.

Computer system 100 (FIG. 1), the instruction buffer storing operations 310 (FIG. 3), and/or the data structure storing requests 410 may include fewer components or additional components. For example, in some embodiments, the functionality of memory controller 122 (FIG. 1) is implemented in at least one of the processing elements 110 (FIG. 1). Consequently, in some embodiments there may not be a memory controller 122 (FIG. 1) in computer system 100 (FIG. 1). Furthermore, in some embodiments, processing of the second request may be handled by one or more of I/O managers 118 (FIG. 1) instead of and/or in conjunction with control logic 112 (FIG. 1).

Two or more components in computer system 100 (FIG. 1), in the instruction buffer storing operations 310 (FIG. 3), and/or in the data structure storing requests 410 may be combined into a single component, and/or a position of one or more components may be changed. Thus, components in computer system 100 (FIG. 1), such as processing elements 110 (FIG. 1), may be disposed on one or more integrated circuits.

Additionally, in processes 200 (FIG. 2A) and 250 (FIG. 2B), there may be fewer or additional operations. Moreover, two or more operations may be combined into a single operation, and/or a position of one or more operations may be changed.

While the preceding embodiments illustrate computer system 100 (FIG. 1) with identical processing elements 110, in other embodiments this computer system includes different types of processing elements, in which a respective type of processing element includes different control logic from the other types of processing elements. Furthermore, in some embodiments, some of the processing elements 110 may not support atomic operations.

The preceding description has been presented to enable any person skilled in the art to make and use the disclosed embodiments, and was provided in the context of a particular application and its requirements. Various modifications to the disclosed embodiments will be readily apparent to those skilled in the art, and the general principles defined herein may be applied to other embodiments and applications without departing from the spirit and scope of the present description. Thus, the present description is not intended to be limited to the embodiments shown, but is to be accorded the widest scope consistent with the principles and features disclosed herein. Moreover, the foregoing descriptions of embodiments have been presented for purposes of illustration and description only. They are not intended to be exhaustive or to limit the present description to the forms disclosed. Accordingly, many modifications and variations will be apparent to practitioners skilled in the art. Additionally, the above disclosure is not intended to limit the present description. The scope of the present description is defined by the appended claims.

What is claimed is:

1. A processor, comprising:
processing elements;
caches associated with respective ones of the processing elements; and
a communication channel coupled to the processing elements and to memory, the memory including an address space that is shared by the processing elements;
wherein, prior to executing an atomic operation, a first processing element determines if data associated with the atomic operation is stored in a first cache associated with the first processing element, the data having a state defined by a cache-coherence protocol;
wherein, if the first processing element determines that the data is not stored in the first cache, the first processing element sends a request including the atomic operation for the data on via the communication channel to at least one of the other processing elements; and
wherein, if the data having the state is stored in a second cache associated with a second processing element, the second processing element executes the atomic operation.

2. The processor of claim 1, wherein processing elements without the data having the state stored in their associated caches provide additional replies to the first processing element via the communication channel.

3. The processor of claim 2, further comprising the memory, wherein, if no other processing element performs the atomic operation in response to the request, the first processing element receives the data having the state from the memory and performs the atomic operation.

4. The processor of claim 1, further comprising a cache-coherence mechanism coupled to the communication channel, wherein the first processing element provides the request to the cache-coherence mechanism, which determines if the data is stored in another of the caches with the data having the state; and, if yes, the cache-coherence mechanism provides the request, including the atomic operation, to another processing element associated with the other cache.

5. The processor of claim 4, wherein the cache-coherence mechanism determines if the data is stored in another of the caches, with the data having the state, by performing a lookup into a look-up table, which includes storage and state information for the caches.

6. The processor of claim 1, wherein the atomic operation is indicated by a tag which is specified by software that provides instructions including the atomic operation to the processor.

7. The processor of claim 1, wherein the atomic operation includes one or more instructions for a respective instruction set architecture that, when executed, either completes or fails in its entirety, and which executes without a conflict occurring at one or more addresses associated with the data.

8. The processor of claim 1, wherein the state can be one of a modified state and an exclusive state.

9. The processor of claim 1, wherein, prior to executing a non-atomic operation, the first processing element determines if data associated with the non-atomic operation is stored in the first cache, and, if not, the first processing element makes another request for the data associated with the non-atomic operation on the communication channel; and
wherein the other request excludes the non-atomic operation.

10. The processor of claim 1, wherein the atomic operation produces the data as an output.

11. The processor of claim 1, wherein the atomic operation uses the data as an input.

12. The processor of claim 1, wherein the request specifies a time interval during which the atomic operation is to be performed; and
wherein the request expires if the atomic operation has not been performed during the time interval.

13. The processor of claim 1, wherein the atomic operation includes multiple atomic operations which are to be executed as a unit.

14. The processor of claim 1, wherein the request includes multiple addresses associated with the data.

15. The processor of claim 1, further comprising:
the memory; and
a memory controller coupled to the communication channel and the memory, wherein the memory controller waits for replies to the request from at least the one of the other processing elements prior to taking action in response to the request.

16. The processor of claim 1, further comprising:
the memory; and
a memory controller coupled to the communication channel and the memory, wherein, if none of the other processing elements performs the atomic operation, the memory controller performs the atomic operation and replies to the first processing element via the communication channel.

17. The processor of claim 1, further comprising the memory, wherein, if no other processing element performs the atomic operation, the memory performs the atomic operation and replies to the first processing element via the communication channel.

18. The processor of claim 1, wherein the second processing element associated with the second cache provides a reply on the communication channel if the second processing element executes the atomic operation.

19. A method for processing an atomic operation in a processor that includes multiple processing elements and associated caches, which reside in a shared address space, comprising:
assigning the atomic operation to a first processing element, wherein, prior to executing an atomic operation, the first processing element performs one or more actions, including:
determining if data associated with the atomic operation is stored in a first cache associated with the first processing element, the data having a state defined by a cache-coherence protocol; and,
if the first processing element determines that the data is not stored in the first cache, providing a request including the atomic operation for the data on a communication channel in the processor, wherein the communication channel couples the processing elements to at least one of the other processing elements; and
wherein a second processing element performs one or more additional actions, including:
determining if the data associated with the state is stored in a second cache associated with the second processing element; and
if so, executing the atomic operation.

20. The method of claim 19, wherein, if the determination is negative, the one or more additional actions performed by the second processing element includes providing a reply to the first processing element via the communication channel.

21. The method of claim 19, wherein the first processing element provides the request to a cache-coherence mechanism, which performs one or more additional actions, including:
determining if the data is stored in another of the caches, with the data having the state; and, if yes,
providing the request, including the atomic operation, to another processing element associated with the other cache.

22. The method of claim 19, wherein the atomic operation is indicated by a tag which is specified by software that provides instructions including the atomic operation to the processor.

23. The method of claim 19, wherein the atomic operation includes one or more instructions for an instruction set architecture that, when executed, either complete or fail as a unit, and which execute without a conflict occurring at one or more addresses associated with the data.

24. The method of claim 19, wherein the state can be one of a modified state and an exclusive state.

25. The method of claim 19, wherein the first processing element performs additional actions, including:
receiving the data having the state from a memory coupled to the communication channel if no other processing element performs the atomic operation; and
performing the atomic operation.

26. The method of claim 19, wherein the atomic operation produces the data as an output.

27. The method of claim 19, wherein the atomic operation uses the data as an input.

28. The method of claim 19, wherein the request specifies a time interval during which the atomic operation is to be performed; and
wherein the request expires if the atomic operation has not been performed during the time interval.

29. The method of claim 19, wherein the atomic operation includes multiple atomic operations which are to be executed as a unit.

30. The method of claim 19, wherein the request includes multiple addresses associated with the data.

31. The method of claim 19, wherein a memory controller, coupled to the communication channel, performs one or more additional actions, including:

waiting for replies to the request from at least the one of the other processing elements prior to taking action in response to the request.

32. The method of claim 19, wherein the one or more additional actions performed by the second processing element includes providing a reply on the communication channel if the second processing element executes the atomic operation.

33. The method of claim 19, wherein a memory controller, coupled to the communication channel, performs one or more additional actions, including:

performing the atomic operation if no other processing element performs the atomic operation; and replying to the first processing element via the communication channel.

34. The method of claim 19, wherein a memory, coupled to the communication channel, performs one or more additional actions, including:

performing the atomic operation if no other processing element performs the atomic operation; and replying to the first processing element via the communication channel.

35. A computer system, comprising:

processing elements;

caches associated with respective ones of the processing elements;

a communication channel coupled to the processing elements; and memory coupled to the communication channel, the memory including an address space that is shared by the processing elements;

wherein, prior to executing an atomic operation, a first processing element determines if data associated with the atomic operation is stored in a first cache associated with the first processing element, the data having a state defined by a cache-coherence protocol;

wherein, if the first processing element determines that the data is not stored in the first cache, the first processing element sends a request including the atomic operation for the data on via the communication channel to at least one of the other processing elements; and wherein, if the data having the state is stored in a second cache associated with a second processing element, the second processing element executes the atomic operation.

\* \* \* \* \*